US010753808B2

(12) United States Patent
Tanaka et al.

(10) Patent No.: US 10,753,808 B2
(45) Date of Patent: Aug. 25, 2020

(54) TEMPERATURE DETECTION DEVICE

(71) Applicant: Yazaki Corporation, Tokyo (JP)

(72) Inventors: Hiraku Tanaka, Shizuoka (JP); Tomohiro Matsushima, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 241 days.

(21) Appl. No.: 15/921,014

(22) Filed: Mar. 14, 2018

(65) Prior Publication Data

US 2018/0274985 A1 Sep. 27, 2018

(30) Foreign Application Priority Data

Mar. 24, 2017 (JP) .................. 2017-058676

(51) Int. Cl.
  *G01K 1/14* (2006.01)
  *G01K 7/22* (2006.01)
  *G01K 1/16* (2006.01)

(52) U.S. Cl.
  CPC ............. *G01K 1/143* (2013.01); *G01K 1/16* (2013.01); *G01K 7/22* (2013.01)

(58) Field of Classification Search
  CPC ............ G01K 1/143; G01K 1/16; G01K 7/22
  See application file for complete search history.

(56) References Cited

U.S. PATENT DOCUMENTS

| | | | | |
|---|---|---|---|---|
| 4,959,633 A * | 9/1990 | Kiraly | ...................... | G01K 7/16 338/22 R |
| 4,967,137 A * | 10/1990 | Canitrot | ................ | H02J 7/1438 219/203 |
| 5,714,924 A * | 2/1998 | Takeuchi | ................. | G01K 7/22 338/22 R |
| 5,813,766 A | 9/1998 | Chen | | |
| 6,262,497 B1 * | 7/2001 | Muroi | .................... | G04C 23/02 307/116 |
| 6,927,549 B2 * | 8/2005 | Ashiya | .................... | H02P 29/02 318/471 |
| 2005/0046542 A1 * | 3/2005 | Ozawa | ................... | H01C 1/022 338/22 R |
| 2012/0112581 A1 * | 5/2012 | Maekawa | .............. | H02K 3/522 310/71 |
| 2012/0193086 A1 * | 8/2012 | van Dijk | .................. | F24F 11/83 165/287 |
| 2015/0188242 A1 * | 7/2015 | Koyama | ................... | H01R 9/18 439/171 |
| 2016/0197330 A1 * | 7/2016 | Takase | .................. | H01M 2/206 429/92 |
| 2016/0359317 A1 * | 12/2016 | Yamanaka | ............ | H02M 7/003 |
| 2017/0324225 A1 * | 11/2017 | Nakayama | ............ | H01M 2/202 |
| 2018/0183079 A1 * | 6/2018 | Yamada | .............. | H01M 2/1077 |

FOREIGN PATENT DOCUMENTS

JP 2016-007102 A 1/2016

* cited by examiner

*Primary Examiner* — Lisa M Caputo
*Assistant Examiner* — Philip L Cotey
(74) *Attorney, Agent, or Firm* — Sughrue Mion, PLLC

(57) ABSTRACT

A temperature detection device includes a fitting member and a temperature detector. The fitting member has a wall fitted to a relay terminal such that the wall surrounds the relay terminal connecting a terminal on a power source side and a terminal on an electrical load side. The temperature detector is fixed to the wall on the side opposite to the relay terminal side of the wall. The wall has a spring portion that applies, to the relay terminal, a force directed toward the temperature detector.

8 Claims, 12 Drawing Sheets

TEMPERATURE DETECTION DEVICE

CROSS-REFERENCE TO RELATED APPLICATION(S)

The present application claims priority to and incorporates by reference the entire contents of Japanese Patent Application No. 2017-058676 filed in Japan on Mar. 24, 2017.

BACKGROUND OF THE INVENTION

1. Field of the Invention

The present invention relates to a temperature detection device.

2. Description of the Related Art

Relay terminals have been available that connect terminals on a power source side and terminals on a load side. Japanese Patent Application Laid-open No. 2016-7102 discloses a technique of an electrical connection box that includes a plurality of busbars connected to a high-voltage battery, a low-voltage battery and the like, relay terminals fitted to some of plate shaped terminals of the busbars, and a case housing the busbars and the relay terminals. The relay terminal described in Japanese Patent Application Laid-open No. 2016-7102 connects the plate shaped terminal of the busbar and the plate shaped terminal of an electronic component such as a relay.

It is examined that the relay terminals are protected by current control on the basis of temperatures of the relay terminals. From a viewpoint of improving reliability of the current control, it is desirable that the temperatures of the relay terminals are accurately detected.

SUMMARY OF THE INVENTION

It is an object of the present invention to provide a temperature detection device that can accurately detect a temperature of a relay terminal.

In order to achieve the above mentioned object, a temperature detection device according to one aspect of the present invention includes a fitting member that includes a wall configured to be fitted to a relay terminal such that the wall surrounds the relay terminal, the relay terminal connecting a terminal on a power source side and a terminal on an electrical load side; and a temperature detector that is fixed to the wall on a side opposite to the relay terminal side of the wall, wherein the wall has a spring portion that applies, to the relay terminal, a force directing toward the temperature detector.

According to another aspect of the present invention, in the temperature detection device, it is preferable that the wall is formed in a tubular shape allowing insertion of the relay terminal, and the wall is provided with a locking portion on one end portion of the wall in an insertion direction of the relay terminal, the locking portion being configured to lock the relay terminal.

According to still another aspect of the present invention, in the temperature detection device, it is preferable that the wall is a metal plate formed in a shape surrounding the relay terminal, the spring portion is one end portion of the wall and is supported in a cantilever manner, another end portion of the wall has an outside limiting portion that faces the spring portion from the side opposite to the temperature detector side in the direction of the force, and the outside limiting portion abuts the spring portion and limits a further deformation of the spring portion when the spring portion is deformed in a direction away from the temperature detector.

According to still another aspect of the present invention, in the temperature detection device, it is preferable that the wall is a metal plate formed in a shape surrounding the relay terminal, the spring portion is one end portion of the wall and is supported in a cantilever manner, and the wall has an inside limiting portion that abuts the spring portion and limits a further deformation of the spring portion when the spring portion is deformed toward the temperature detector side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes an embodiment of a temperature detection device according to the invention in detail with reference to the accompanying drawings. The embodiment does not limit the invention. The constituent elements of the following embodiment include elements that the persons skilled in the art can easily assume or that are substantially the same as the elements known by those in the art.

Embodiment

Figure 1:
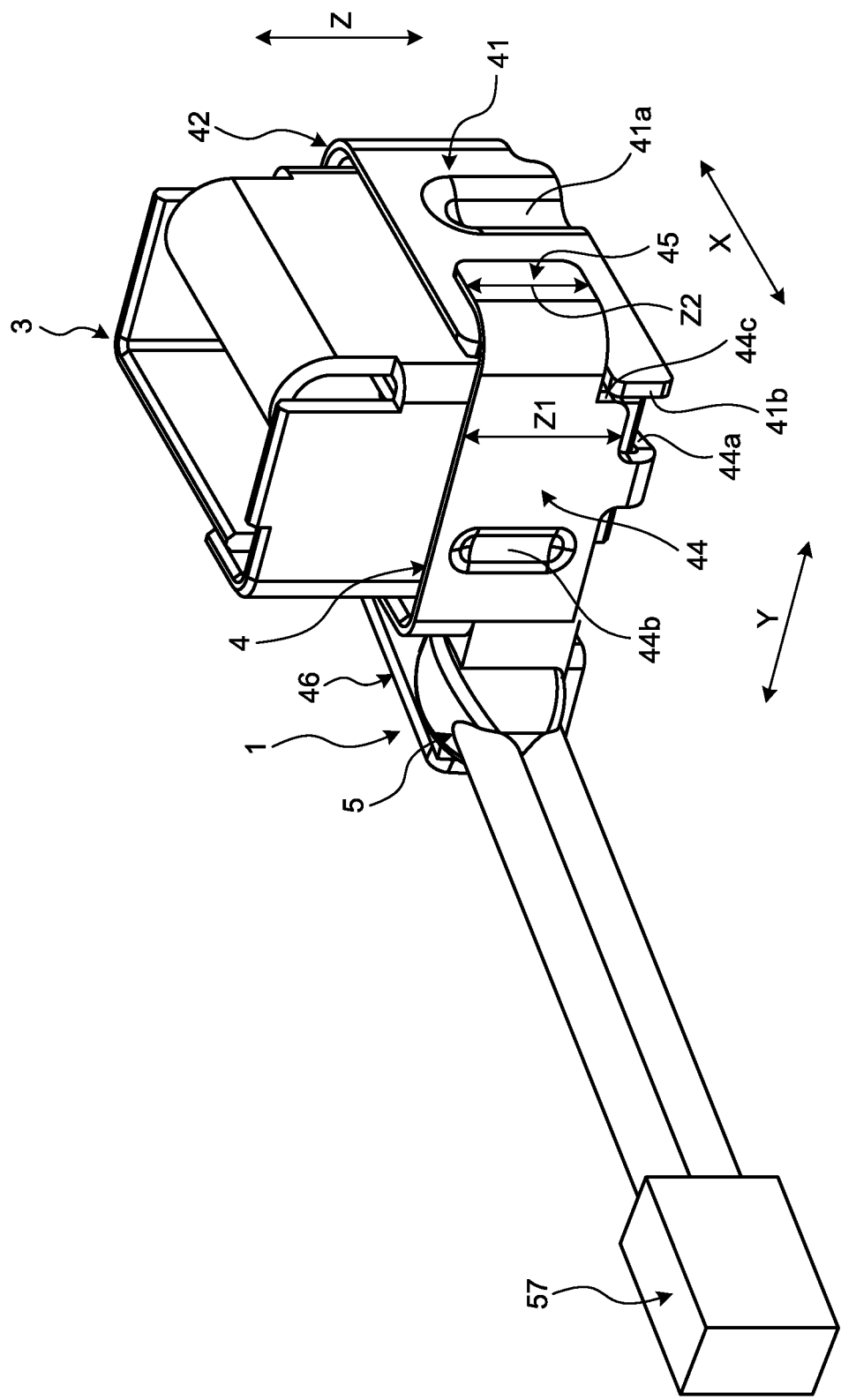
FIG. 1 is a perspective view illustrating a temperature detection device according to an embodiment, the temperature detection device being attached to a relay terminal.
Figure 2:
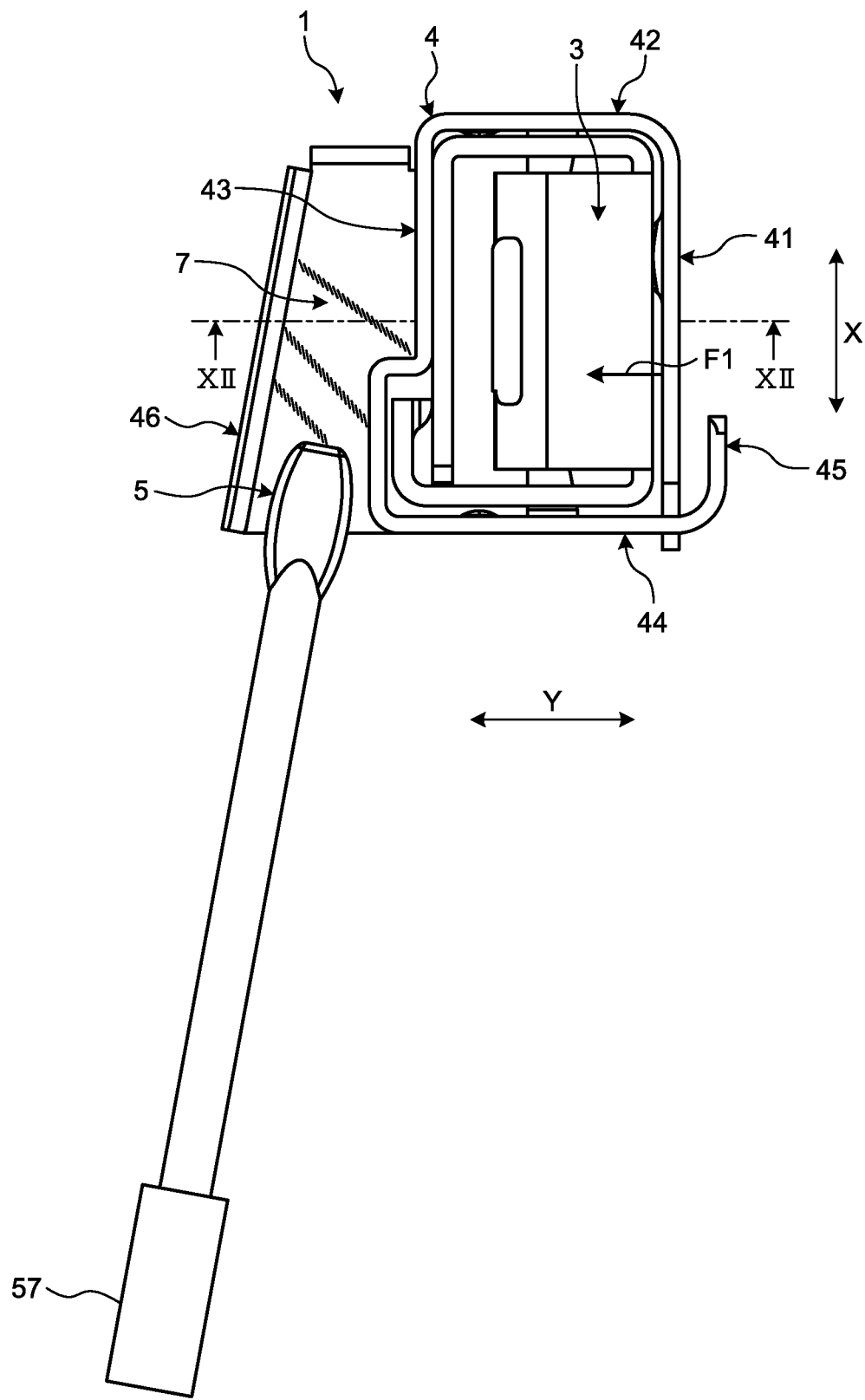
FIG. 2 is a plan view illustrating the temperature detection device according to the embodiment, the temperature detection device being attached to the relay terminal.
Figure 3:
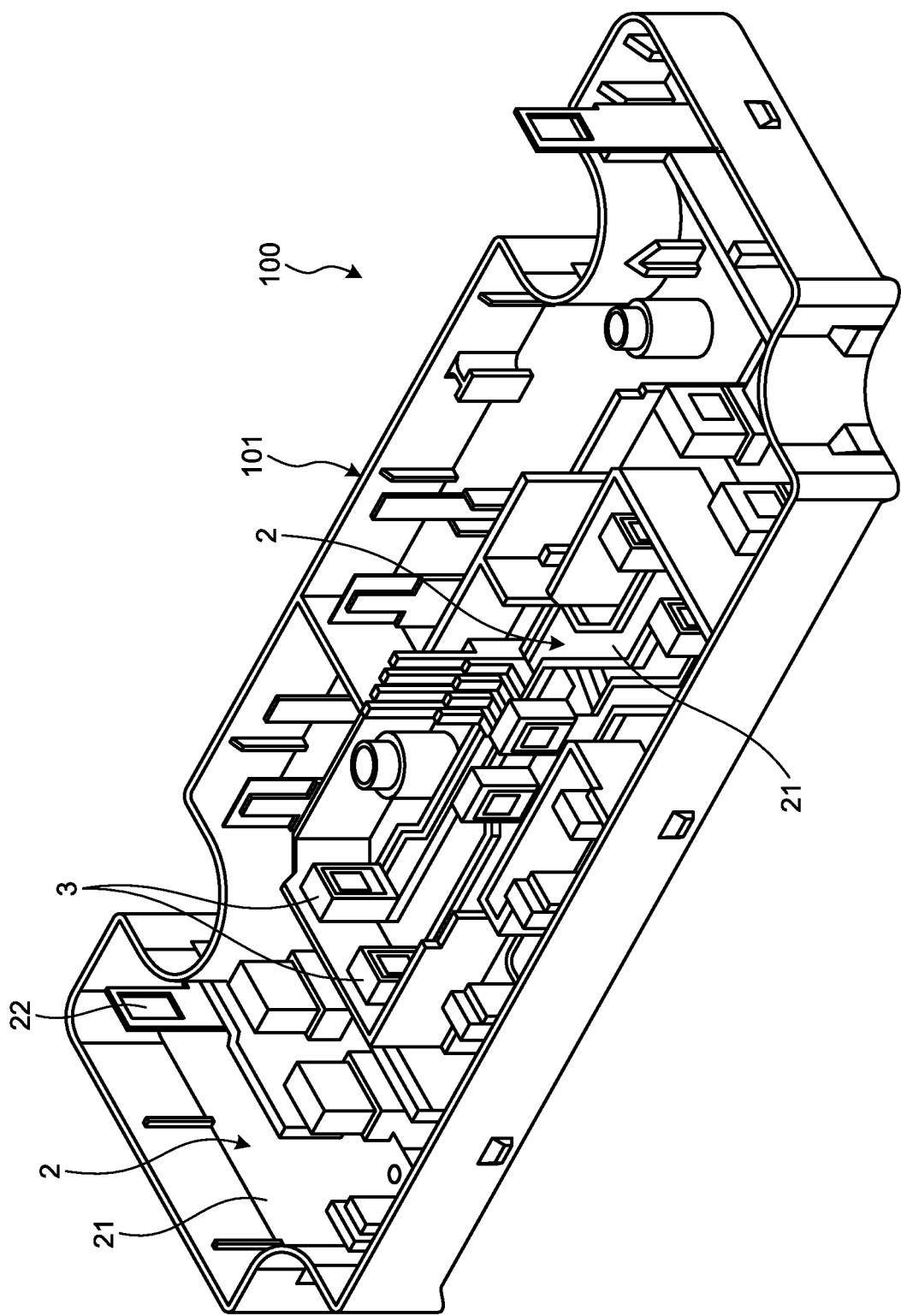
FIG. 3 is a perspective view illustrating an example of an electrical connection box in which the temperature detection device is accommodated.
Figure 4:
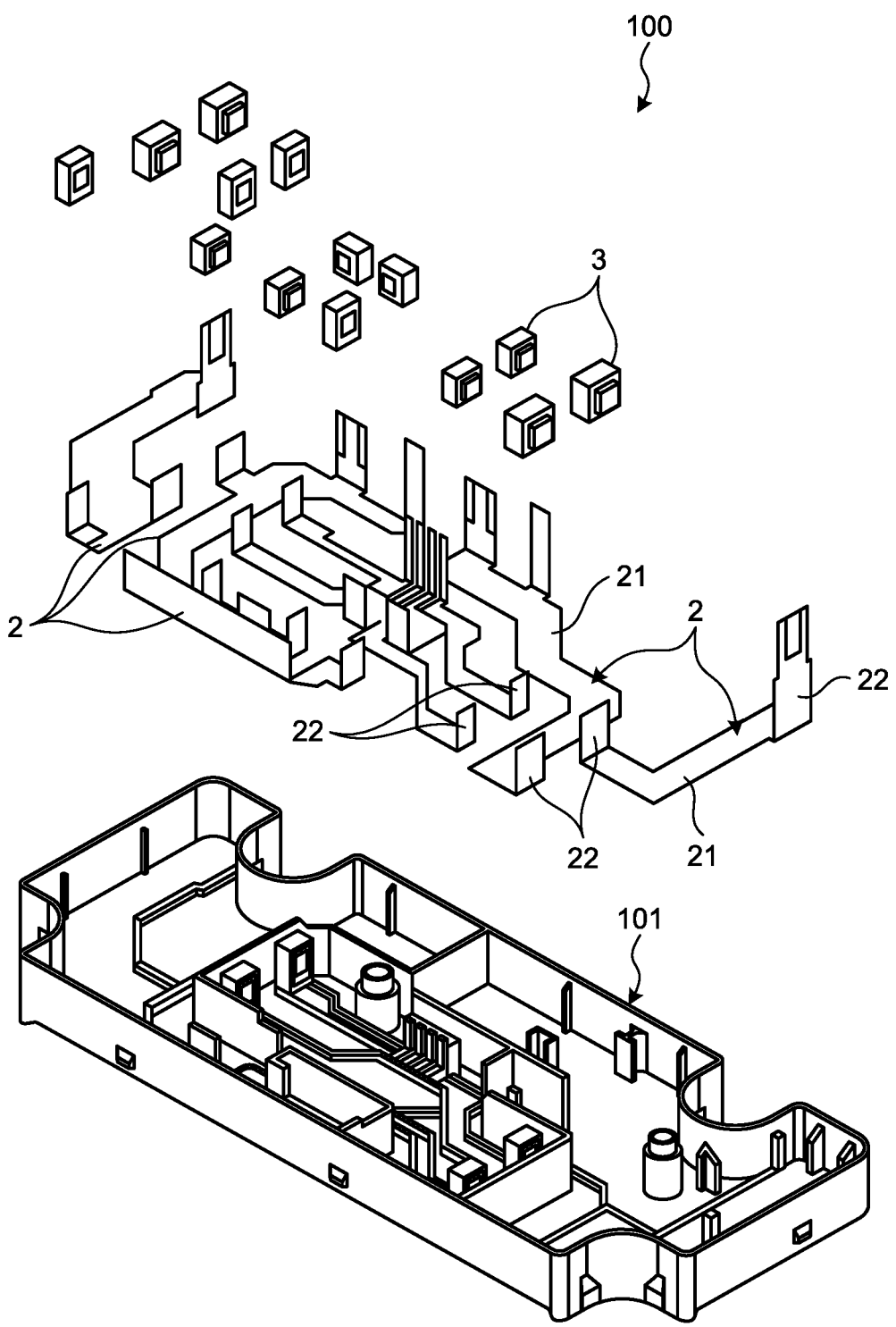
FIG. 4 is an exploded perspective view of the electrical connection box.
Figure 5:
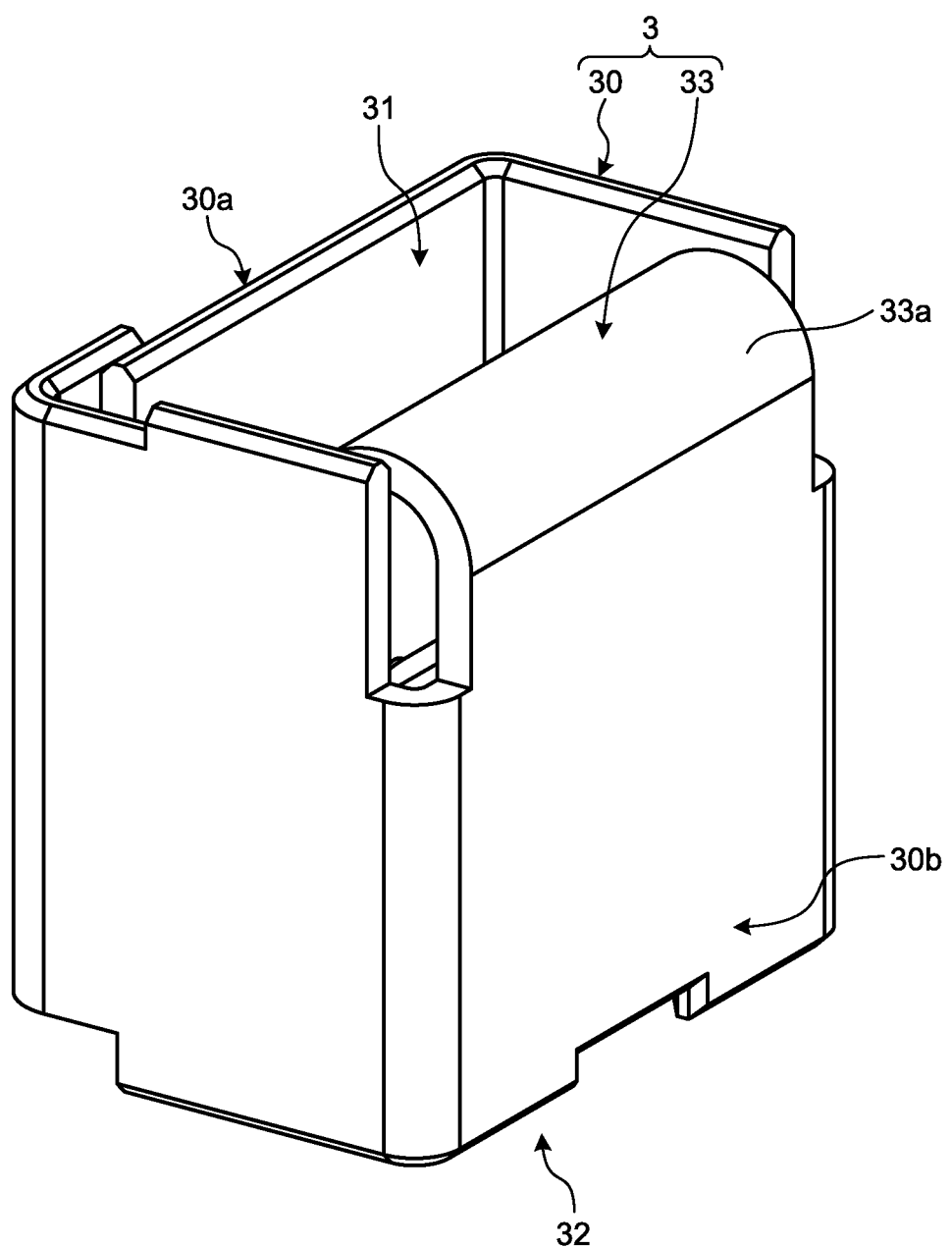
FIG. 5 is a perspective view of the relay terminal.
Figure 6:
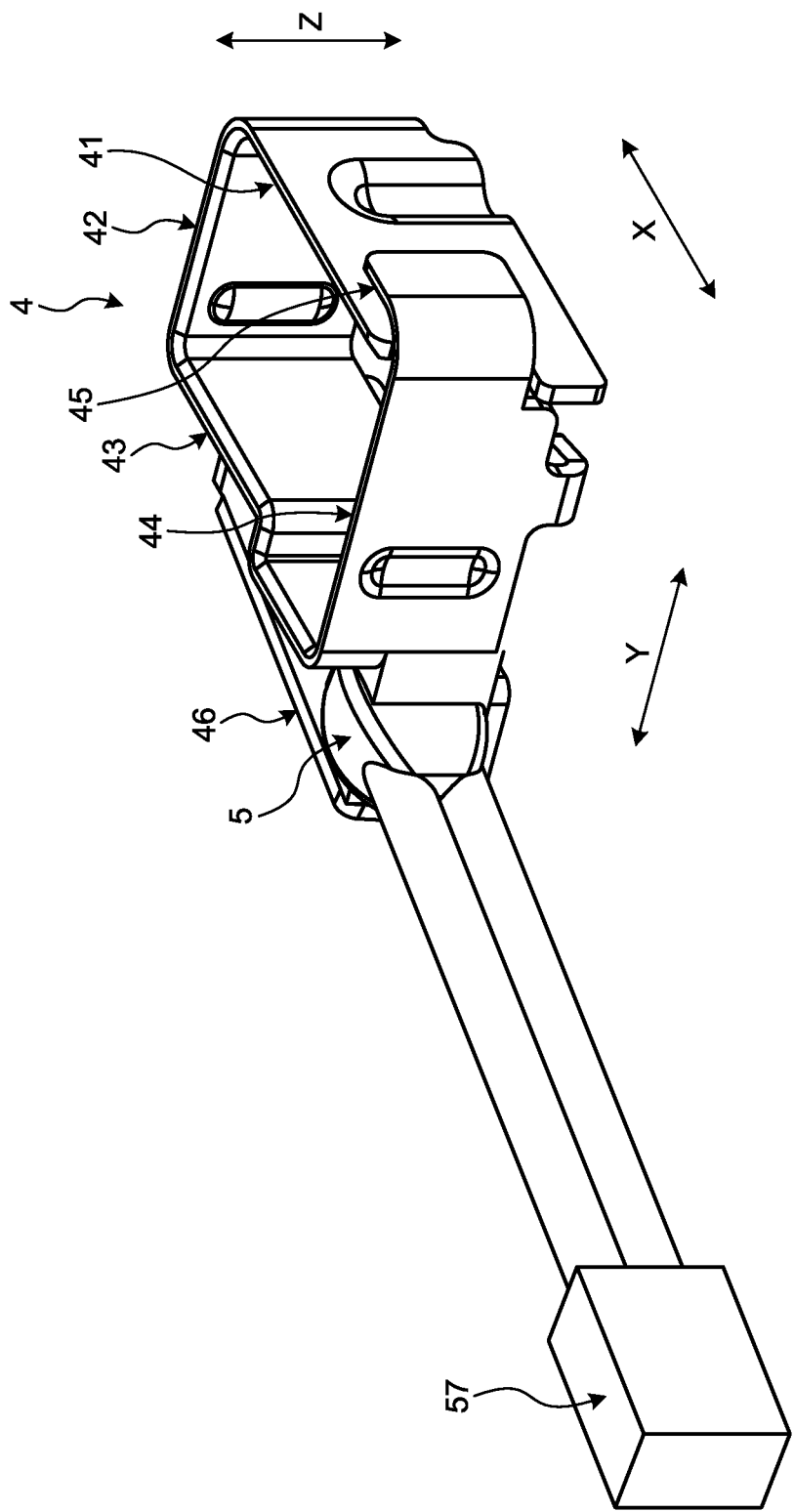
FIG. 6 is a perspective view of the temperature detection device according to the embodiment.
Figure 7:
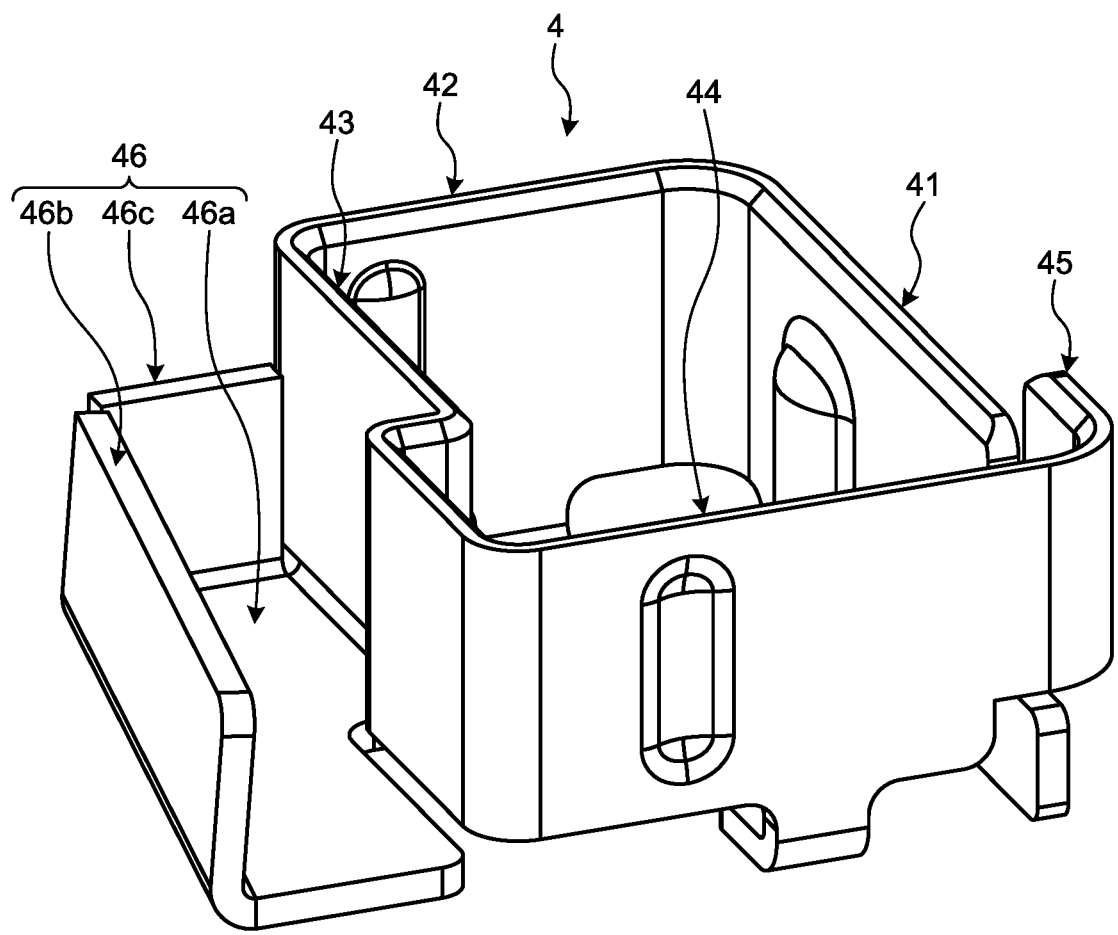
FIG. 7 is a perspective view of a fitting member according to the embodiment.
Figure 8:
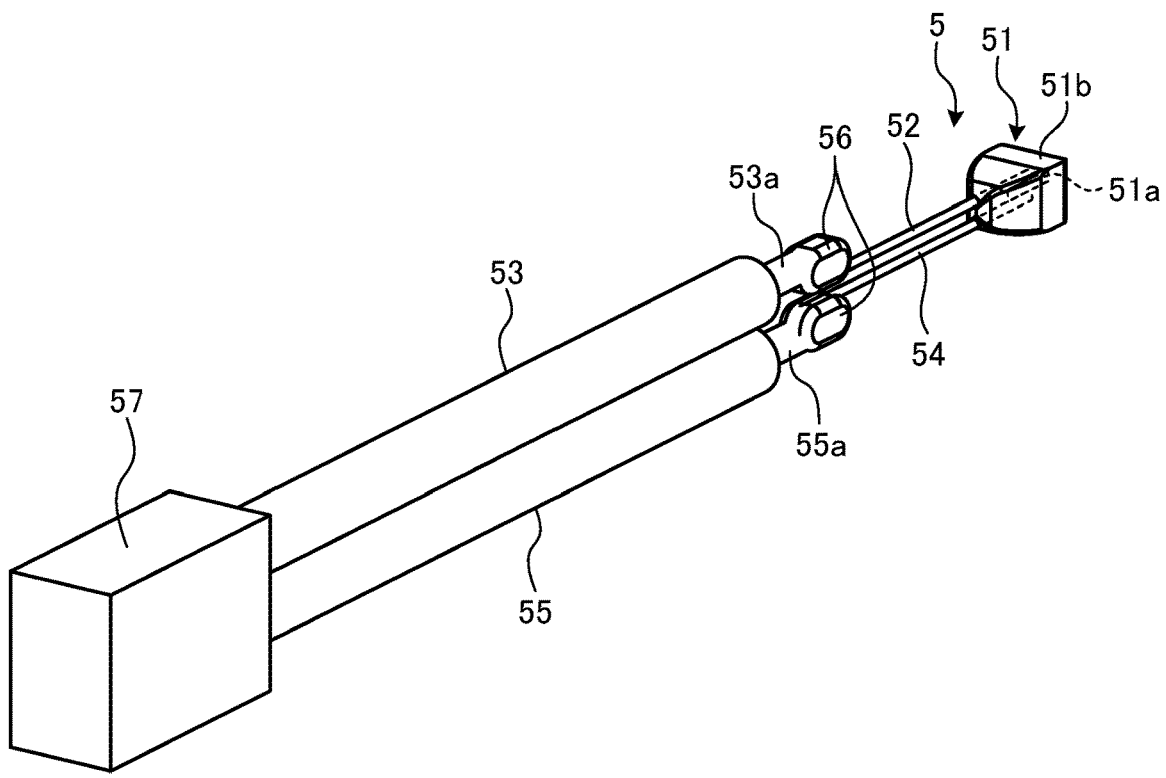
FIG. 8 is a perspective view illustrating an internal structure of a temperature detector according to the embodiment.
Figure 9:
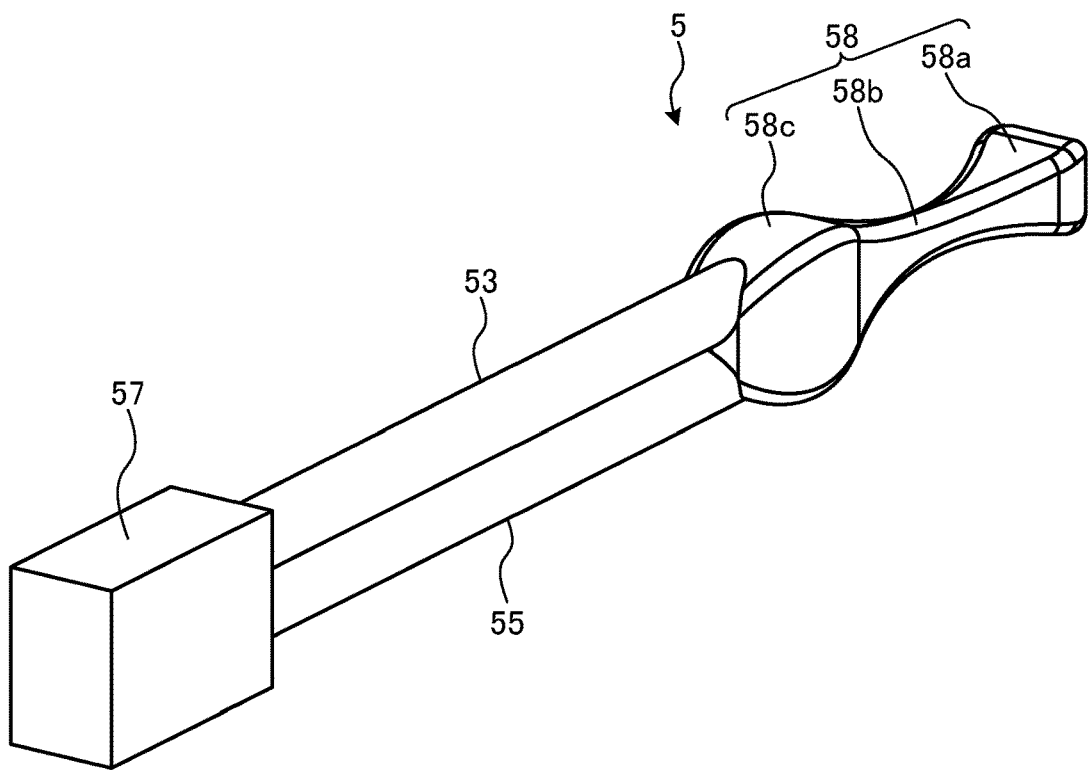
FIG. 9 is a perspective view of the temperature detector according to the embodiment.
Figure 10:
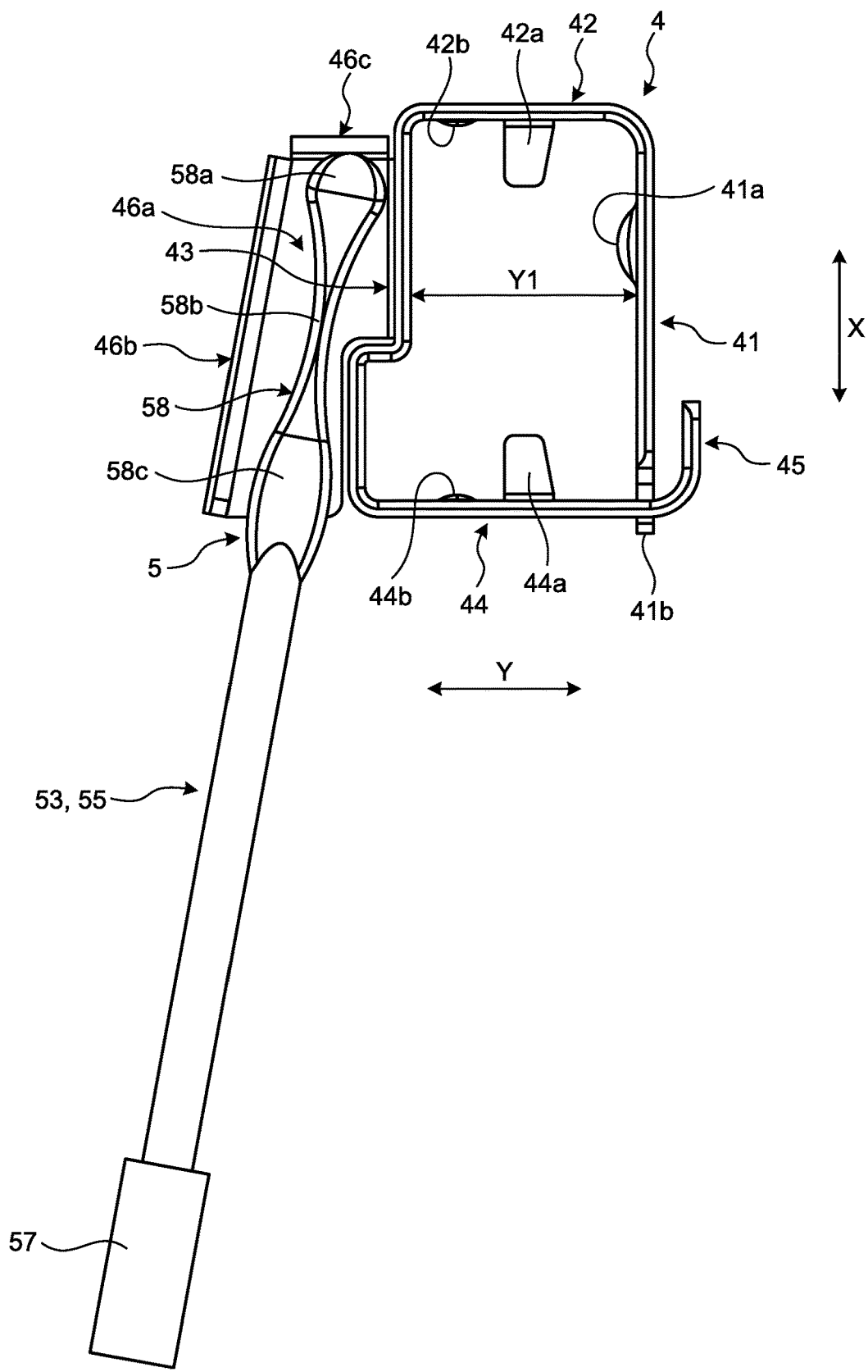
FIG. 10 is a plan view illustrating an arrangement of the temperature detector in the fitting member.
Figure 11:
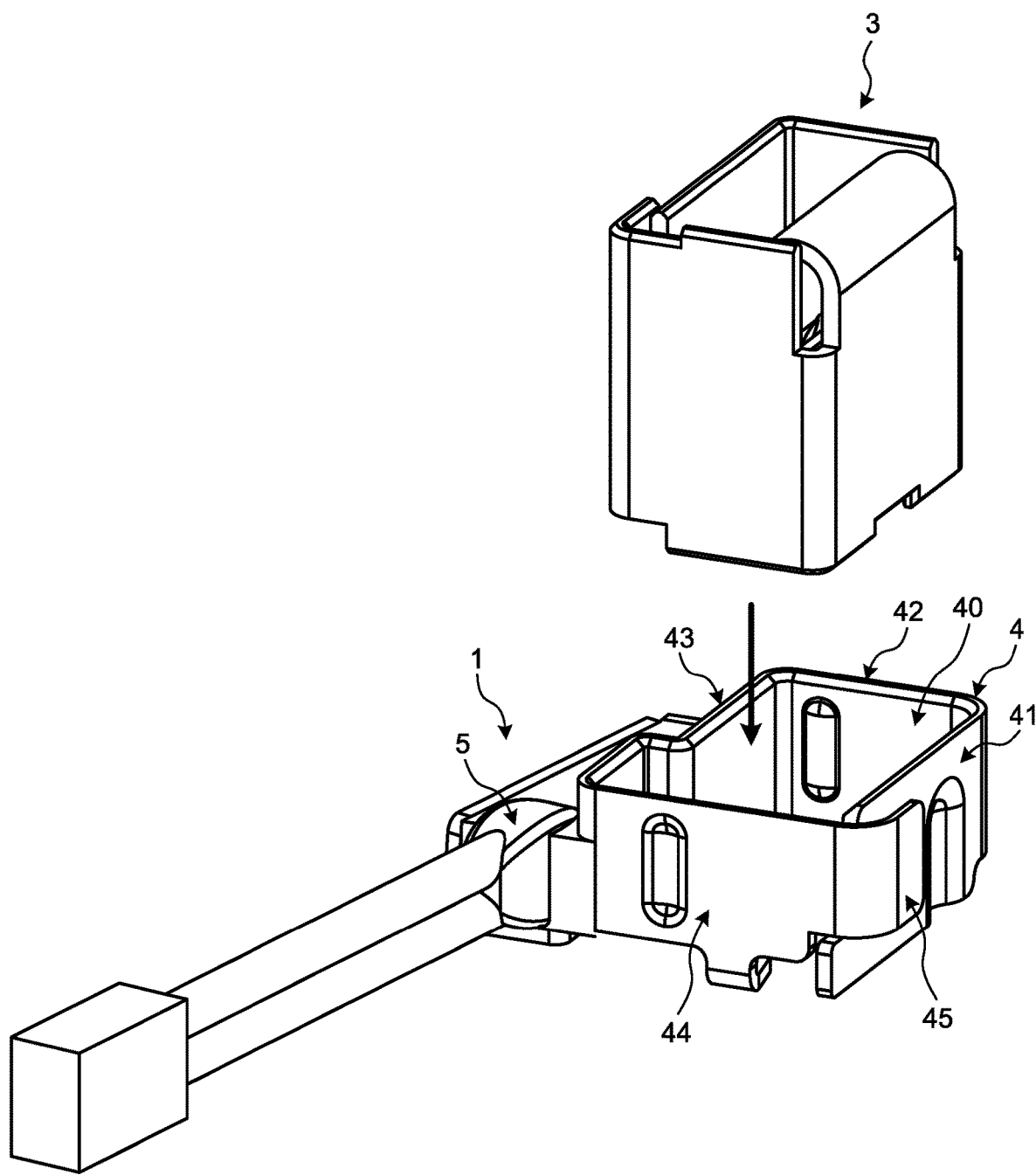
FIG. 11 is a schematic diagram illustrating a direction in which the temperature detection device and the relay terminal fit together.
Figure 12:
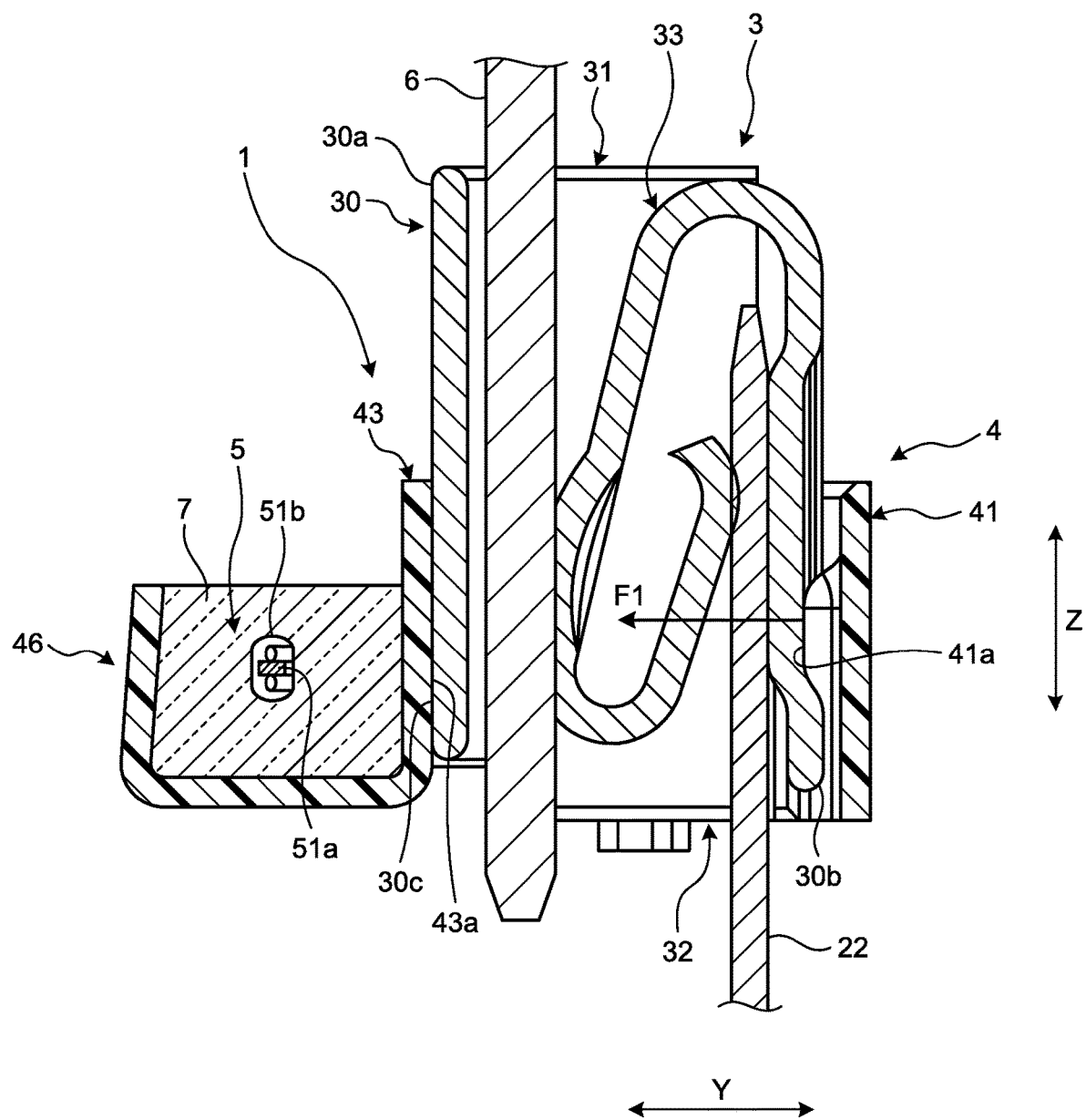
FIG. 12 is a cross-sectional view for explaining a force applied by a spring portion.

The embodiment is described with reference to FIGS. 1 to 12. The embodiment relates to the temperature detection device. FIG. 1 is a perspective view illustrating the temperature detection device in the embodiment, the temperature detection device being attached to a relay terminal. FIG. 2 is a plan view illustrating the temperature detection device in the embodiment, the temperature detection device being attached to the relay terminal. FIG. 3 is a perspective view illustrating an example of an electrical connection box in which the temperature detection device is accommodated. FIG. 4 is an exploded perspective view of the electrical connection box. FIG. 5 is a perspective view of the relay terminal. FIG. 6 is a perspective view of the temperature detection device according to the embodiment. FIG. 7 is a perspective view of a fitting member according to the embodiment. FIG. 8 is a perspective view illustrating an internal structure of a temperature detector according to the embodiment. FIG. 9 is a perspective view of the temperature detector according to the embodiment. FIG. 10 is a plan view illustrating an arrangement of the temperature detector in the fitting member. FIG. 11 is a schematic view illustrating a fitting direction in which the temperature detection device and the relay terminal fit together. FIG. 12 is a cross-sectional view for explaining a force applied by a spring portion. FIG. 12 illustrates the cross section along the line XII-XII in FIG. 2.

As illustrated in FIGS. 1 and 2, a temperature detection device 1 according to the embodiment includes a fitting member 4 and a temperature detector 5. The fitting member 4 has walls 41, 42, 43, 44, and 45 fitted to a relay terminal 3 such that they surround the relay terminal 3. The temperature detector 5 is fixed to an outer side surface of the fitting member 4. The temperature detector 5 detects a temperature of the relay terminal 3. The temperature detector 5 is electrically connected to a temperature monitoring device and outputs the detection result to the temperature monitoring device.

A plurality of relay terminals 3 are arranged inside an electrical connection box 100 illustrated in FIGS. 3 and 4, for example. The electrical connection box 100 is connected to a power source, such as a high voltage battery, mounted on a vehicle such as an automobile, for example. The high voltage battery is a power source for running a vehicle. The high voltage battery supplies electrical power to an electrical load such as a motor generator for running the vehicle. The electrical connection box 100, which is interposed between the power source and the electrical load, controls electrical power supply to the electrical load. The relay terminal 3 connects a terminal on a power source side and a terminal on an electrical load side. The relay terminal 3 in the embodiment is what is called a female-female terminal, and electrically connects two male terminals.

As illustrated in FIGS. 3 and 4, the electrical connection box 100 includes a case 101 and a cover, which is not illustrated. The cover covers an opening of the case 101 and forms a housing together with the case 101. The case 101 is formed of an insulating synthetic resin, for example. Inside the case 101, busbars 2 are arranged. The busbars 2 are held by the case 101. Each of the busbars 2 is a conductive member formed of a conductive metal plate. The busbar 2 has a main body 21 and terminals 22. The main body 21 and the terminals 22 are formed by processing such as bending of a metal base material. The main body 21, which is a plate shaped structural portion, is held by the case 101. Each of the terminals 22 is bent such that the terminal 22 is orthogonal to the main body 21. The terminal 22, which is a plate shaped structural portion, has an engagement portion that engages with the relay terminal 3.

The terminal 22 is inserted into the relay terminal 3 to engage with the relay terminal 3. The relay terminal 3 is held by the case 101 via the busbar 2 and by the cover (not illustrated) of the case 101. As illustrated in FIG. 12, to the relay terminal 3, a terminal 6 on an electrical load side is connected in addition to the terminal 22. The terminal 6 is a male terminal of a relay, for example. The relay is held by a holder provided on the cover of the electrical connection box 100. The terminal 6 is inserted into and passed through an insertion hole provided on the cover, and then inserted into the relay terminal 3. As illustrated in FIG. 12, the terminal 6 is inserted into the relay terminal 3 from a side opposite the side where the terminal 22 is inserted into, and engages with the relay terminal 3. Into the relay terminal 3, two male terminals (the terminals 22 and 6) are inserted toward different directions from each other.

As illustrated in FIG. 5, the relay terminal 3 is a member having a rectangular parallelepiped shape as a whole. The relay terminal 3 is a conductive member formed of a conductive metal plate. The relay terminal 3 is formed by processing such as bending of a copper plate, for example. The relay terminal 3 may be finished by tin plating, for example. The relay terminal 3 includes a main body 30 and a spring portion 33. The main body 30, which is a rectangular cylindrical structural portion, has openings on both sides thereof. The spring portion 33 is formed by bending a part of a metal base plate. A distal portion of the spring portion 33 is folded in a U-shape. An end portion 33a (hereinafter described as a "base end portion") on the main body 30 side of the spring portion 33 is folded in a U-shape. The spring portion 33 is bent at the base end portion 33a such that the distal portion folded in a U-shape is in an internal space of the main body 30.

The relay terminal 3 has a first insertion port 31 and a second insertion port 32. The first insertion port 31 is an opening on one side of the main body 30. The second insertion port 32 is an opening on the other side of the main body 30. As illustrated in FIG. 12, the terminal 6 on the electrical load side is inserted into the first insertion port 31. The terminal 6 is inserted between a wall 30a of the main body 30 and the spring portion 33. The spring portion 33 presses the terminal 6 to the wall 30a and holds the terminal 6. The terminal 22, i.e., the terminal on the power source side, is inserted into the second insertion port 32. The terminal 22 is inserted between a wall 30b of the main body 30 and the spring portion 33. The spring portion 33 presses the terminal 22 to the wall 30b and holds the terminal 22. The terminal 6 may be connected on the power source side while the terminal 22 may be connected on the electrical load side.

As illustrated in FIG. 6, the fitting member 4 includes the walls 41, 42, 43, 44, and 45, and a housing unit 46. The walls 41, 42, 43, 44, and 45 are also described as the first wall 41, the second wall 42, the third wall 43, the fourth wall 44, and the fifth wall 45, respectively. The five walls 41, 42, 43, 44, and 45 continue in this order. The five walls 41, 42, 43, 44, and 45, and the housing unit 46 are formed by processing such as bending of a metal base material. The walls 41, 42, 43, 44, 45, and the housing unit 46 are integrated. The first wall 41 is one end portion of the walls 41, 42, 43, 44, and 45 that are integrally formed of the metal plate. The fifth wall 45 is the other end portion of the walls 41, 42, 43, 44, and 45 that are integrally formed of the metal plate.

The walls 41, 42, 43, 44, and 45 are formed in a shape surrounding the relay terminal 3 in a bending manner. The cross-sectional shape of the main body 30 of the relay terminal 3 in the embodiment is a rectangle. The walls 41, 42, 43, 44, and 45 are formed by being bent in such a shape that the cross-sectional shape of the shape is a rectangle corresponding to the shape of the main body 30. More specifically, the first wall 41 and the third wall 43 face each other, and the second wall 42 and the fourth wall 44 face each other. A direction in which the first wall 41 and the third wall 43 extend is orthogonal to a direction in which the second wall 42 and the fourth wall 44 extend.

In the following description, the direction in which the second wall 42 and the fourth wall 44 face each other is described as a "width direction X" while the direction in which the first wall 41 and the third wall 43 face each other is described as a "depth direction Y". The width direction X and the depth direction Y are orthogonal to each other. The direction orthogonal to each of the width direction X and the depth direction Y is described as a "height direction Z". The height direction Z coincides with the axial direction of the relay terminal 3. The electrical connection box 100 is mounted on the vehicle such that the height direction Z coincides with a vehicle up-down direction, for example. In the following description, an upper side corresponds to an upper side of the vehicle while a lower side corresponds to a lower side of the vehicle when the electrical connection box 100 is mounted onto the vehicle. The upper side and the lower side in the following description may differ from the upper side of the vehicle and the lower side of the vehicle, respectively, when the electrical connection box 100 is actually mounted on the vehicle in some cases.

The fifth wall 45 faces the first wall 41 from the side opposite to the temperature detector 5 side of the first wall 41 in the depth direction Y. The fifth wall 45 extends from the end portion of the fourth wall 44 in the width direction X toward the second wall 42. The fitting member 4 is formed such that a gap is provided between the first wall 41 and the fifth wall 45 in the depth direction Y. The size of the gap between the first wall 41 and the fifth wall 45 in the depth direction Y is determined such that an amount of deformation of the first wall 41 is within an allowable range, which is described later.

The housing unit 46 continues to the lower end of the third wall 43. As illustrated in FIGS. 2 and 6, the housing unit 46 accommodates and holds the temperature detector 5 at a position on the side opposite to the first wall 41 side of the third wall 43. As illustrated in FIG. 7, the housing unit 46 has a bottom wall 46a, a first sidewall 46b, and a second sidewall 46c. The bottom wall 46a, the first sidewall 46b, and the second sidewall 46c are formed by processing such as bending of a metal plate. The bottom wall 46a projects from the lower end of the third wall 43 toward the side opposite to the first wall 41 side of the third wall 43. The first sidewall 46b projects from the bottom wall 46a toward the upper side and faces the third wall 43. The second sidewall 46c projects from the end portion on the second wall 42 side of the bottom wall 46a toward the upper side. The third wall 43, the bottom wall 46a, the first sidewall 46b, and the second sidewall 46c form a housing space in which the temperature detector 5 is accommodated.

As illustrated in FIGS. 8 and 9, the temperature detector 5 includes an element unit 51, leads 52 and 54, and a covering portion 58. The temperature detector 5, covered wires 53 and 55, and a connector 57 constitute a temperature detection unit. The element unit 51 includes a temperature detection element 51a and a glass 51b. The temperature detection element 51a changes its electrical characteristic such as a resistance value in accordance with a temperature. The temperature detection element 51a is a thermistor, for example. A pair of leads 52 and 54 are electrically connected to the temperature detection element 51a. The glass 51b covers the temperature detection element 51a and the distal portions of the leads 52 and 54. A core wire 53a is electrically connected to the lead 52 by a solder 56. A core wire 55a is electrically connected to the lead 54 by the solder 56. The covered wires 53 and 55 are connected to the connector 57. A connector on the temperature monitoring device side is connected to the connector 57. The temperature detection element 51a and the distal portions of the leads 52 and 54 may be covered by a resin instead of the glass 51b, for example.

As illustrated in FIG. 9, the covering portion 58 covers the element unit 51 and the leads 52 and 54. The covering portion 58 is an insulating cover formed of an insulating synthetic resin such as an epoxy resin. The covering portion 58 integrally covers the element unit 51, the leads 52 and 54, the solder 56, and the core wires 53a and 55a. The covering portion 58 covers the covers of the covered wires 53 and 55 so as to prevent the core wires 53a and 55a from being exposed. The covering portion 58 electrically isolates conductors such as the leads 52 and 54, the solder 56, and the core wires 53a and 55a from the fitting member 4.

The covering portion 58 has a distal portion 58a, a central portion 58b, and a base end portion 58c. The distal portion 58a covers the element unit 51. The central portion 58b, which is a constricted portion of the covering portion 58, covers the leads 52 and 54. The base end portion 58c covers the solder 56, the core wires 53a and 55a, and the covers of the covered wires 53 and 55. As described in the following, the covering portion 58 is sealed in the housing unit 46 of the fitting member 4 and fixed to the housing unit 46.

As illustrated in FIG. 10, the temperature detector 5 is placed in the housing unit 46. More specifically, the temperature detector 5 is placed on the bottom wall 46a such that the distal portion 58a of the covering portion 58 is in contact with the second sidewall 46c. In other words, the temperature detector 5 is placed in the housing unit 46 such that the covered wires 53 and 55 project from the housing unit 46 in the width direction X. A part of the base end portion 58c may project from the housing unit 46 toward the outside of the housing unit 46. A resin is injected into the housing unit 46 in the state described above. As a result, the covering portion 58 is fixed to the housing unit 46. The resin used for the injection is an insulating synthetic resin. For example, the resin is an epoxy resin. The resin used for the injection is preferably a resin having high heat conductivity. The injected resin is solidified, thereby forming a holder 7 illustrated in FIG. 2. The holder 7 holds the temperature detector 5. The holder 7 is held by the housing unit 46 and the third wall 43.

In the temperature detection device 1 in the embodiment, heat is transferred from the relay terminal 3 to the temperature detector 5 via the fitting member 4 and the holder 7. It is desirable that a heat transfer path is appropriately established for allowing the temperature detector 5 to accurately detect the temperature of the relay terminal 3. In the embodiment, the third wall 43 is present between the temperature detector 5 and the relay terminal 3, for example. A stable contact state between the third wall 43 and the relay terminal 3 makes the heat transfer path between the temperature detector 5 and the relay terminal 3 stable. As a result, the temperature detector 5 can accurately detect the temperature of the relay terminal 3.

The fitting member 4 in the embodiment includes the spring portion that applies, to the relay terminal 3, an elastic force directing toward the temperature detector 5 side. The spring portion in the embodiment is the first wall 41. The first wall 41 is supported in a cantilever manner. More specifically, the first wall 41 is supported at the end portion thereof on the second wall 42 side and the end thereof on the fourth wall 44 side is a free end. The first wall 41, thus, behaves as a plate spring that is bent and deformed in the depth direction Y. In the fitting member 4 in the embodiment, a distance Y1 (refer to FIG. 10) between the first wall 41 and the third wall 43 is designed such that the distance Y1 allows the first wall 41 to press the relay terminal 3 to the third wall 43. The distance Y1 is the distance when the fitting member 4 is not fitted to the relay terminal 3, in other words, when no external force acts on the fitting member 4. The fitting member 4 is configured to cause the first wall 41 to be bent and deformed toward the fifth wall 45 side when fitted to the relay terminal 3.

The first wall 41 is provided with a projection 41a. The projection 41a projects toward the third wall 43. The projection 41a is disposed on the first wall 41 at a position more on the second wall 42 side than the central position in the width direction X. In other words, the projection 41a is disposed on the base end side of the first wall 41. The projection 41a may be disposed such that the projection 41a faces the distal portion 58a in the depth direction Y. In such a disposition, the relay terminal 3 can be pressed to a part near the distal portion 58a on the third wall 43. As can be seen from FIG. 1, the projection 41a extends from the lower end of the first wall 41 to a position near the upper end of the first wall 41 in the height direction Z.

When the relay terminal 3 is assembled to the electrical connection box 100, first, the fitting member 4 is fitted to the relay terminal 3. As illustrated in FIG. 11, the relay terminal 3 is inserted into an opening 40 on the upper side of the fitting member 4. The relay terminal 3 is inserted between the first wall 41 and the third wall 43 while causing the first wall 41 to be bent and deformed. The relay terminal 3 causes the first wall 41 to be bent and deformed in a direction away from the third wall 43. The first wall 41 that is bent and deformed presses the relay terminal 3 to the third wall 43. In other words, the first wall 41 presses the relay terminal 3 toward the temperature detector 5 side. As a result, a stable contact state between the relay terminal 3 and the third wall 43 is maintained.

In the fitting member 4 in the embodiment, the first wall 41 is provided with the projection 41a. The projection 41a can reduce a variation in position of the contact between the first wall 41 and the relay terminal 3. In other words, the projection 41a makes it possible to cause the relay terminal 3 to abut a target position on the first wall 41. As a result, a stable contact state between the relay terminal 3 and the third wall 43 is maintained. In addition, a pressing force of the first wall 41 pressing the relay terminal 3 is easily stabilized.

The relay terminal 3 inserted into the fitting member 4 is locked by locking portions 42a and 44a that are illustrated in FIG. 10. The locking portions 42a and 44a are provided on the lower end of the fitting member 4 and project in the width direction X. The locking portion 42a projects from the lower end of the second wall 42 toward the fourth wall 44. The locking portion 44a projects from the lower end of the fourth wall 44 toward the second wall 42. The relay terminal 3 is positioned in the height direction Z by the locking portions 42a and 44a.

The second wall 42 is provided with a projection 42b projecting toward the fourth wall 44 that faces the second wall 42. The fourth wall 44 is provided with a projection 44b projecting toward the second wall 42 that faces the fourth wall 44. The projections 42b and 44b face each other in the width direction X. The projections 42b and 44b prevent the occurrence of a gap between the relay terminal 3 and each of the walls 42 and 44. The projections 42b and 44b suppress relative movement occurring between the relay terminal 3 and the fitting member 4. The projections 42b and 44b, thus, can stabilize the contact state between the third wall 43 and the relay terminal 3.

The relay terminal 3 fitted to the fitting member 4 is assembled to the busbar 2. The relay terminal 3 is assembled to the busbar 2 preliminarily held by the case 101, for example. After the relay terminal 3 is assembled to the terminal 22 of the busbar 2, the connector on the temperature monitoring device side is connected to the connector 57 of the temperature detector 5. The terminal 6 on the electrical load side is connected to the relay terminal 3.

As illustrated in FIG. 12, the first wall 41 of the fitting member 4 applies a force F1 to the wall 30b of the relay terminal 3. The force F1 is directed toward the temperature detector 5 in the depth direction Y. The force F1 presses the wall 30a of the relay terminal 3 to the third wall 43. In the embodiment, an abutting surface 30c, which abuts the third wall 43, of the wall 30a and an abutting surface 43a, which abuts the wall 30a, of the third wall 43 are flat surfaces. The force F1 causes the abutting surfaces 30c and 43a to be in contact with each other, e.g., to be tightly in contact with each other. As a result, a heat transfer path is established from the wall 30a to the temperature detector 5 via the third wall 43 and the holder 7. The temperature detection device 1 in the embodiment, thus, can increase detection accuracy in detecting the temperature of the relay terminal 3.

The fitting member 4 in the embodiment has a limiting portion that limits a movable range of the first wall 41. The following describes the limiting portion. The fifth wall 45 is an outside limiting portion that limits an excessive deformation of the first wall 41 in a direction away from the temperature detector 5. As illustrated in FIG. 2, the fifth wall 45 faces the first wall 41 from the side opposite to the temperature detector 5 side of the first wall 41 in the depth direction Y. The first wall 41 applies, to the relay terminal 3, the force F1 directed toward the temperature detector 5. The direction of the force F1 is the depth direction Y. The fifth wall 45 faces the relay terminal 3 with the first wall 41 interposed therebetween in the direction of the force F1.

In the fitting of the relay terminal 3 and the fitting member 4, the first wall 41 receives the reaction force of the force F1 and is deformed toward the side opposite to the temperature detector 5 side of the first wall 41. When the relay terminal 3 is inserted while being tilted, an amount of deformation of the first wall 41 can be excessively increased. When the first wall 41 is deformed in the direction away from the temperature detector 5, the fifth wall 45 abuts the first wall 41 to limit a further deformation of the first wall 41. The fifth wall 45 is configured to abut the first wall 41 before the first wall 41 is plastically deformed. In other words, the fifth wall 45 abuts the first wall 41 before an amount of deformation of the first wall 41 reaches a deformation amount in a plastic deformation region. An operator who fits the relay terminal 3 to the fitting member 4 can easily determine whether an amount of deformation of the first wall 41 is within the allowable range. When the first wall 41 abuts the fifth wall 45, the operator knows that a problem has occurred.

As illustrated in FIG. 1, the fourth wall 44 is provided with an inside limiting portion 44c. When the first wall 41 is deformed toward the temperature detector 5 side, the inside limiting portion 44c abuts the first wall 41 to limit a further deformation of the first wall 41. The inside limiting portion 44c faces the side opposite to the temperature detector 5 side in the depth direction Y. As illustrated in FIG. 1, the height Z2 of the fifth wall 45 is smaller than the height Z1 of the fourth wall 44 in the fitting member 4 in the embodiment. The fourth wall 44 has a cutout portion that forms the inside limiting portion 44c, and the height of the inside limiting portion 44c corresponds to a difference between heights Z1 and Z2. The inside limiting portion 44c is provided at the end portion of the fourth wall 44 on the fifth wall 45 side and the lower edge portion of the fourth wall 44.

The first wall 41 has a portion to be locked 41b that is locked by the inside limiting portion 44c. The portion to be locked 41b is a piece portion provided on the free end side of the first wall 41. The portion to be locked 41b is at the lower end portion of the distal of the first wall 41. The portion to be locked 41b extends in a space under the fourth wall 44 such that the portion to be locked 41b intersects the fourth wall 44 in a plan view. The portion to be locked 41b faces the inside limiting portion 44c in the depth direction Y.

When fitting the relay terminal 3 and the fitting member 4, the operator holds the fitting member 4. When the operator holds the fitting member 4 with an excessive force, the first wall 41 can be excessively deformed toward the temperature detector 5 side. The inside limiting portion 44c is configured to abut the first wall 41 before the first wall 41 is plastically deformed. In other words, the inside limiting portion 44c locks the portion to be locked 41b before an amount of deformation of the first wall 41 reaches a deformation amount in a plastic deformation region. The operator can easily determine whether an amount of deformation of the first wall 41 is within the allowable range. When the first wall 41 abuts the inside limiting portion 44c, the operator knows that the operator's holding force is too strong.

As described above, the temperature detection device 1 in the embodiment includes the fitting member 4 and the temperature detector 5. The fitting member 4 is a member that has the walls 41, 42, 43, 44, and 45 fitted to the relay terminal 3 such that they surround the relay terminal 3 connecting the terminal 22 serving as the terminal on the power source side and the terminal 6 on the electrical load side. The temperature detector 5 is fixed to the third wall 43 on the side opposite to the relay terminal 3 side of the third wall 43. The walls 41, 42, 43, 44, and 45 include the spring portion that applies, to the relay terminal 3, the force F1 directed toward the temperature detector 5. In the embodiment, the spring portion in the embodiment is the first wall 41.

In the temperature detection device 1 in the embodiment, the force F1 applied by the spring portion presses the relay terminal 3 toward the temperature detector 5. The force F1 presses the relay terminal 3 to the third wall 43, among the walls 41, 42, 43, 44, and 45, to which the temperature detector 5 is fixed. The temperature detection device 1 in the embodiment, thus, can establish an appropriate heat transfer path between the relay terminal 3 and the temperature detector 5, thereby making it possible to increase accuracy in temperature detection. The terminal 6 may be the terminal on the power source side while the terminal 22 may be the terminal on the electrical load side.

The walls 41, 42, 43, 44, and 45 in the embodiment are formed in a tubular shape allowing the insertion of the relay terminal 3. The locking portions 42a and 44a that lock the relay terminal 3 are provided on one end portion in the insertion direction of the relay terminal 3 of the walls 41, 42, 43, 44, and 45. The locking portions 42a and 44a can lock and position the inserted relay terminal 3. The locking portions 42a and 44a can suppress the relay terminal 3 from coming off from the fitting member 4.

For example, a force is applied to the fitting member 4 when the relay terminal 3 combined with the temperature detection device 1 is assembled to the electrical connection box 100 in some cases. As an example of such cases, a force is applied to the fitting member 4 in such a direction that the fitting member 4 comes off from the relay terminal 3 when a wire is routed for connecting the connector 57 to the connector on the temperature monitoring device side. As another example, a force is applied to the fitting member 4 in such a direction that the fitting member 4 comes off from the relay terminal 3 due to the vibration in running of the vehicle. The locking portions 42a and 44a abut the relay terminal 3 and prevent the fitting member 4 from coming off from the relay terminal 3 when such forces are applied.

The walls 41, 42, 43, 44, and 45 that are formed in a tubular shape may not be formed in a closed shape in a plan view. For example, a gap is present between the first wall 41 and the fifth wall 45 in the walls 41, 42, 43, 44, and 45 in the embodiment. As illustrated in FIG. 2, the wall 41, which is the one end portion of the walls 41, 42, 43, 44, and 45, and the wall 45, which is the other end portion of the walls 41, 42, 43, 44, and 45, do not continue, when the fitting member 4 is viewed in a plan view. The walls 41, 42, 43, 44, and 45 formed in such shape are also included in "the walls formed in a tubular shape".

In the temperature detection device 1 in the embodiment, the wall composed of the walls 41, 42, 43, 44, and 45 is a metal plate formed in a shape surrounding the relay terminal 3. The first wall 41 serving as the spring portion is one end portion of the walls 41, 42, 43, 44, and 45, and is supported in a cantilever manner. The other end portion of the walls 41, 42, 43, 44, and 45 has the outside limiting portion that faces the first wall 41 from the side opposite to the temperature detector 5 side in the direction of the force F1. In the embodiment, the fifth wall 45 functions as the outside limiting portion. When the first wall 41 is deformed in the direction away from the temperature detector 5, the fifth wall 45 abuts the first wall 41 to limit a further deformation of the first wall 41. The temperature detection device 1 in the embodiment, thus, can prevent an amount of deformation of the first wall 41 serving as the spring portion from being excessively increased.

In the temperature detection device 1 in the embodiment, the wall composed of the walls 41, 42, 43, 44, and 45 is a metal plate formed in a shape surrounding the relay terminal 3. The first wall 41 serving as the spring portion is one end portion of the walls 41, 42, 43, 44, and 45, and is supported in a cantilever manner. The walls 41, 42, 43, 44, and 45 has the inside limiting portion 44c that abuts the first wall 41 to limit a further deformation of the first wall 41 when the first wall 41 is deformed in the direction toward the temperature detector 5. The temperature detection device 1 in the embodiment, thus, can suppress an amount of deformation of the first wall 41 serving as the spring portion from being excessively increased. In the embodiment, the inside limiting portion 44c is provided at the lower edge portion of the fourth wall 44 while the portion to be locked 41b is provided at the lower end portion of the first wall 41. The locations of the inside limiting portion 44c and the portion to be locked 41b are not limited to those described above. For example, the inside limiting portion 44c may be provided at the upper edge portion of the fourth wall 44 while the portion to be locked 41b may be provided at the upper end portion of the first wall 41.

First Modification of Embodiment

Figure 13:
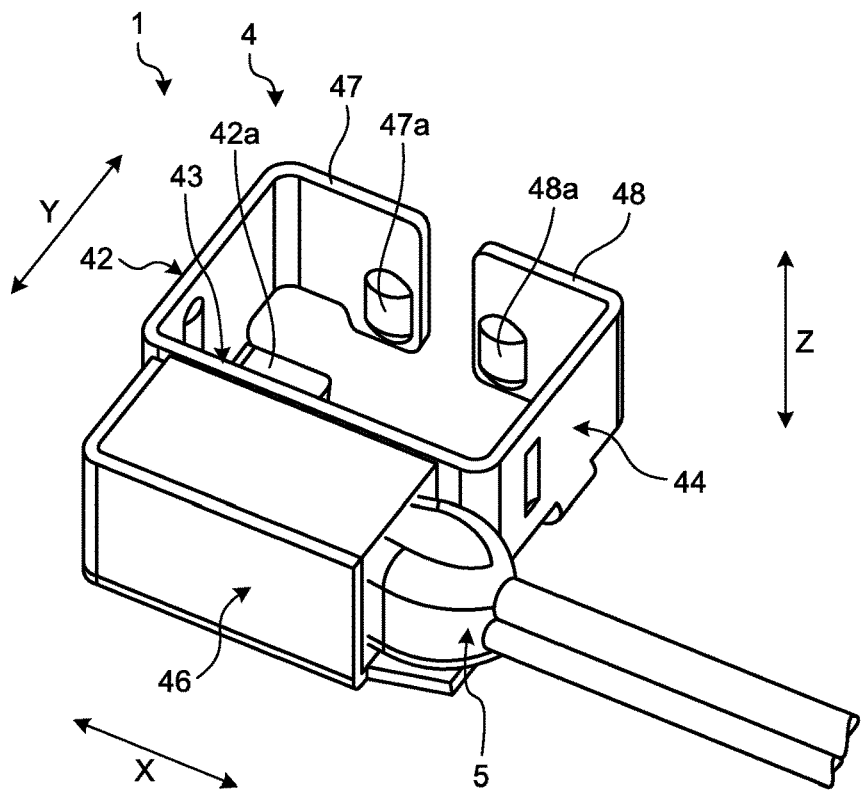
FIG. 13 is a perspective view of the temperature detection device according to a first modification of the embodiment.

The following describes a first modification of the embodiment. FIG. 13 is a perspective view of the temperature detection device according to the first modification of the embodiment. The fitting member 4 in the first modification includes a first wall 47, the second wall 42, the third wall 43, the fourth wall 44, a fifth wall 48, and the housing unit 46. The walls 47, 42, 43, 44, and 48 are formed in a tubular shape allowing the insertion of the relay terminal 3. The wall composed of the walls 47, 42, 43, 44, and 48 in the first modification is a metal plate formed in such a shape that the cross-sectional shape thereof in a plan view is a C-shape.

In the fitting member 4 in the first modification, each of the first wall 47 and the fifth wall 48 functions as the spring portion. The first wall 47 and the fifth wall 48 extend in the width direction X. The distal of the first wall 47 and the distal of the fifth wall 48 face each other in the width direction X. Each of the first wall 47 and the fifth wall 48 is supported in a cantilever manner, and can be bent and deformed toward the depth direction Y.

The first wall 47 has a projection 47a while the fifth wall 48 has a projection 48a. The projections 47a and 48a project toward the third wall 43. The projection 47a is disposed on the distal portion of the wall 47 while the projection 48a is disposed on the distal portion of the wall 48. The housing unit 46 continues to the third wall 43 in the same manner as the housing unit 46 in the above-mentioned embodiment.

The fitting member 4 in the first modification can stabilize the contact state between the third wall 43 and the relay terminal 3 by a force applied to the relay terminal 3 by the two spring portions (the first wall 47 and the fifth wall 48). The temperature detection device 1 in the first modification, thus, can increase detection accuracy in detecting the temperature of the relay terminal 3.

Second Modification of Embodiment

Figure 14:
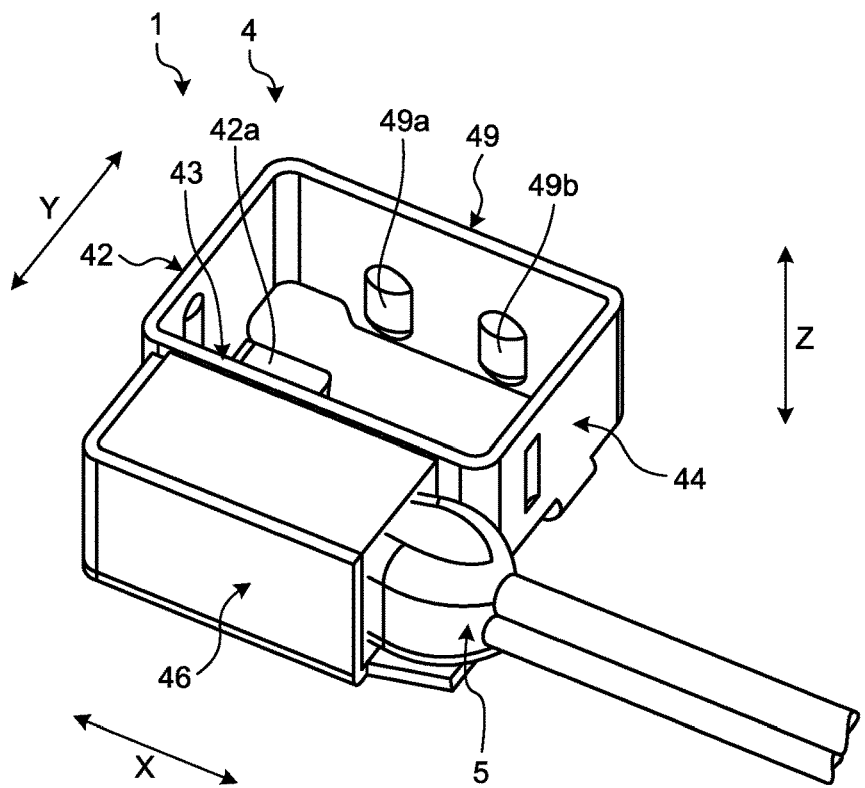
FIG. 14 is a perspective view of the temperature detection device according to a second modification of the embodiment.

The following describes a second modification of the embodiment. FIG. 14 is a perspective view of the temperature detection device according to the second modification of the embodiment. The fitting member 4 in the second modification includes a first wall 49, the second wall 42, the third wall 43, the fourth wall 44, and the housing unit 46. The walls 49, 42, 43, and 44 are formed in a tubular shape allowing the insertion of the relay terminal 3. The wall composed of the walls 49, 42, 43, and 44 in the second modification is a metal plate formed in such a shape that the cross-sectional shape thereof in a plan view is a rectangle. The walls 49, 42, 43, and 44 are integrally formed of a metal plate by being bent in such a shape that the cross-sectional view of the shape is a rectangle in a plan view, and thereafter the end portions are welded so as to be formed in the shape.

In the fitting member 4 in the second modification, the first wall 49 functions as the spring portion. One end of the first wall 49 continues to the second wall 42 while the other end of the first wall 49 continues to the fourth wall 44. The first wall 49 is supported at both ends. The first wall 49 can be bent and deformed toward the depth direction Y.

The first wall 49 has two projections 49a and 49b. The projections 49a and 49b project toward the third wall 43. The projection 49a is disposed on the first wall 49 more on the second wall 42 side than the center of the first wall 49 in the width direction X while the projection 49b is disposed on the first wall 49 more on the fourth wall 44 side than the center. The housing unit 46 continues to the third wall 43 in the same manner as the housing unit 46 in the above-mentioned embodiment.

The fitting member 4 in the second modification allows the first wall 49 to apply, to the relay terminal 3, the force F1 directed toward the temperature detector 5. The temperature detection device 1 in the second modification, thus, can increase detection accuracy in detecting the temperature of the relay terminal 3, in the same manner as the temperature detection device 1 in the above-mentioned embodiment.

Third Modification of Embodiment

The following describes a third modification of the embodiment. The shape of the fitting member 4 is not limited to those exemplarily illustrated in the embodiment and the modifications. For example, in the fitting member 4, the shape formed by the walls fitted to the relay terminal 3 may be appropriately changed in accordance with the shape of the relay terminal 3. The shape of the housing unit 46 may be appropriately changed in accordance with the shape of the temperature detector 5, for example.

The contents disclosed in the embodiment and the modifications can be implemented by appropriately combining them.

The temperature detection device according to the embodiment includes the fitting member and the temperature detector. The fitting member has walls fitted to the relay terminal such that the walls surround the relay terminal connecting the terminal on the power source side and the terminal on the electrical load side. The temperature detector is fixed to the wall on the side opposite to the relay terminal side. The wall has the spring portion that applies, to the relay terminal, a force directing toward the temperature detector. The temperature detection device according to the embodiment can appropriately establish the transfer path that transfers heat from the relay terminal to the temperature detector via the wall. The temperature detection device according to the embodiment, thus, has an advantageous effect of being capable of accurately detecting the temperature of the relay terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A temperature detection device, comprising:
   a fitting member that includes a wall configured to be fitted to a relay terminal such that the wall surrounds the relay terminal and contacts the relay terminal on four sides thereof, the relay terminal connecting a terminal on a power source side and a terminal on an electrical load side; and
   a temperature detector that is fixed to the wall on a side opposite to the relay terminal side of the wall, wherein
   the wall has a spring portion that applies, to the relay terminal, a force directing toward the temperature detector.

2. The temperature detection device according to claim 1, wherein
   the wall is formed in a tubular shape allowing insertion of the relay terminal, and
   the wall is provided with a locking portion on one end portion of the wall in an insertion direction of the relay terminal, the locking portion being configured to lock the relay terminal.

3. The temperature detection device according to claim 1, wherein
the wall is a metal plate formed in a shape surrounding the relay terminal,
the spring portion is one end portion of the wall and is supported in a cantilever manner,
another end portion of the wall has an outside limiting portion that faces the spring portion from the side opposite to the temperature detector side in the direction of the force, and
the outside limiting portion abuts the spring portion and limits a further deformation of the spring portion when the spring portion is deformed in a direction away from the temperature detector.

4. The temperature detection device according to claim 2, wherein
the wall is a metal plate formed in a shape surrounding the relay terminal,
the spring portion is one end portion of the wall and is supported in a cantilever manner,
another end portion of the wall has an outside limiting portion that faces the spring portion from the side opposite to the temperature detector side in the direction of the force, and
the outside limiting portion abuts the spring portion and limits a further deformation of the spring portion when the spring portion is deformed in a direction away from the temperature detector.

5. The temperature detection device according to claim 1, wherein
the wall is a metal plate formed in a shape surrounding the relay terminal,
the spring portion is one end portion of the wall and is supported in a cantilever manner, and
the wall has an inside limiting portion that abuts the spring portion and limits a further deformation of the spring portion when the spring portion is deformed toward the temperature detector side.

6. The temperature detection device according to claim 2, wherein
the wall is a metal plate formed in a shape surrounding the relay terminal,
the spring portion is one end portion of the wall and is supported in a cantilever manner, and
the wall has an inside limiting portion that abuts the spring portion and limits a further deformation of the spring portion when the spring portion is deformed toward the temperature detector side.

7. The temperature detection device according to claim 3, wherein
the wall is a metal plate formed in a shape surrounding the relay terminal,
the spring portion is one end portion of the wall and is supported in a cantilever manner, and
the wall has an inside limiting portion that abuts the spring portion and limits a further deformation of the spring portion when the spring portion is deformed toward the temperature detector side.

8. The temperature detection device according to claim 4, wherein
the wall is a metal plate formed in a shape surrounding the relay terminal,
the spring portion is one end portion of the wall and is supported in a cantilever manner, and
the wall has an inside limiting portion that abuts the spring portion and limits a further deformation of the spring portion when the spring portion is deformed toward the temperature detector side.

\* \* \* \* \*